United States Patent [19]

Föhl

[11] Patent Number: 5,295,714
[45] Date of Patent: Mar. 22, 1994

[54] BELT TIGHTENER FOR VEHICLE SAFETY BELT SYSTEMS

[75] Inventor: Artur Föhl, Schorndorf, Fed. Rep. of Germany

[73] Assignee: TRW Repa GmbH, Alfdorf, Fed. Rep. of Germany

[21] Appl. No.: 970,762

[22] Filed: Nov. 3, 1992

[30] Foreign Application Priority Data

Nov. 7, 1991 [DE] Fed. Rep. of Germany ....... 4136623

[51] Int. Cl.⁵ ...................... B60R 22/36; B60R 22/46
[52] U.S. Cl. ................................. 280/806; 280/801 R; 280/808; 180/268; 180/274; 297/480
[58] Field of Search ............... 280/806, 801, 808, 807; 180/268, 274; 297/480

[56] References Cited

U.S. PATENT DOCUMENTS

| | | | |
|---|---|---|---|
| 4,023,427 | 5/1977 | Beier | 280/806 X |
| 4,258,934 | 3/1981 | Tsuge et al. | 280/806 |
| 4,288,098 | 9/1981 | Tsuge et al. | 280/806 |
| 4,422,669 | 12/1983 | Chiba et al. | 280/806 |
| 4,441,738 | 4/1984 | Tsuge et al. | 280/806 |
| 4,458,921 | 7/1984 | Chiba et al. | 280/806 |
| 4,624,422 | 11/1986 | Hollowell | 280/806 X |
| 4,795,189 | 1/1989 | Vollmer et al. | 180/274 X |
| 4,823,905 | 4/1989 | Piech | 280/806 X |
| 4,884,652 | 12/1989 | Vollmer | 280/806 X |
| 4,913,497 | 4/1990 | Knabel et al. | 280/806 X |
| 4,917,210 | 4/1990 | Danicek | 280/806 X |
| 4,999,004 | 3/1991 | Skanberg et al. | 297/480 |
| 5,104,193 | 4/1992 | Foehl | 297/480 |
| 5,127,671 | 7/1992 | Yano et al. | 280/806 |

Primary Examiner—Margaret A. Focarino
Assistant Examiner—Florian Zeender
Attorney, Agent, or Firm—Tarolli, Sundheim & Covell

[57] ABSTRACT

In a vehicle safety belt system a gripping means (16) is arranged at a webbing section (10) extending between a deflection fitting (12) and the belt retractor (14). In the rest condition the webbing is led freely between the oppositely disposed clamping elements of the gripping means (16). The gripping means (16) is connected via a pulling cable (38) to a pyrotechnic or mechanical belt tightener drive. Return blocking means are formed by a cylinder (44) attached to the vehicle bodywork and a piston (42) displaceable therein, whereby the cylinder wall is deformed plastically for absorbing load peaks.

5 Claims, 3 Drawing Sheets

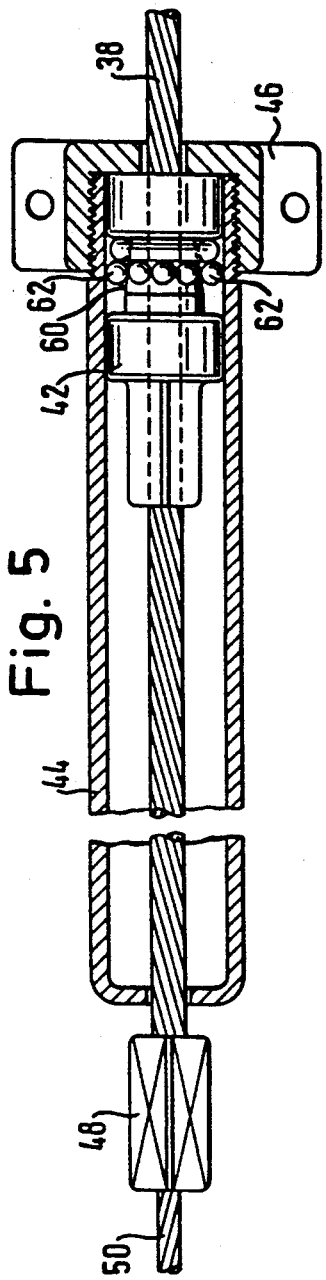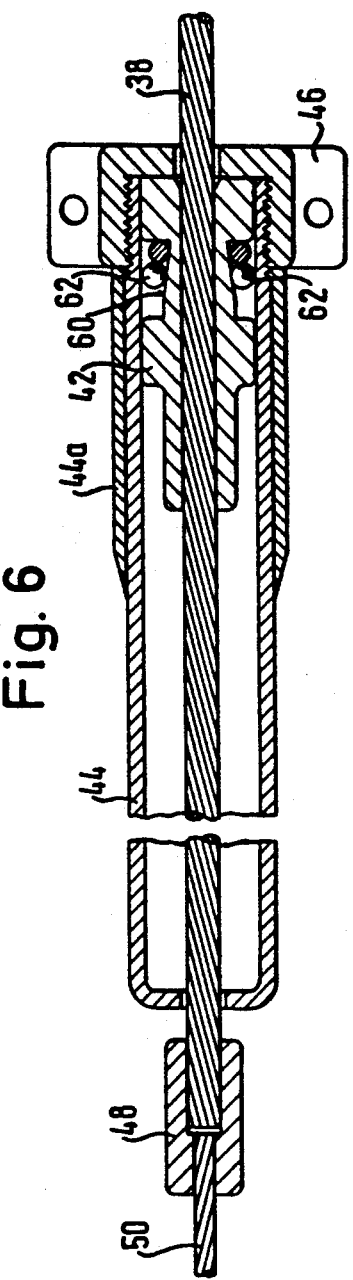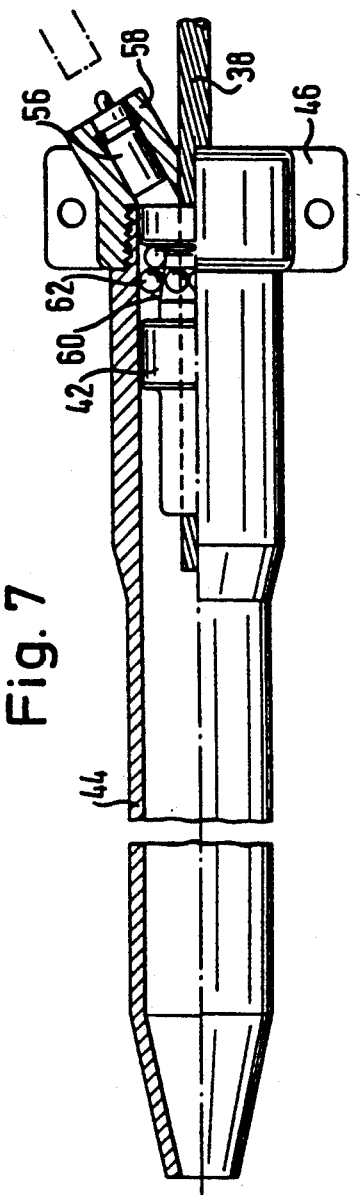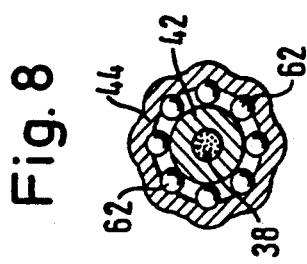

BELT TIGHTENER FOR VEHICLE SAFETY BELT SYSTEMS

BACKGROUND OF THE INVENTION

The present invention relates to a belt tightener for vehicle safety belt systems comprising a belt tightener drive and mechanical gripping means for engaging a belt webbing section upon activation of the tightener drive.

In a safety belt system of this type which is known from German Offenlegungsschrift 34 13 488, the gripping means is connected via a tension transmitting element to the tightener drive. The end of the tension transmitting element remote from the gripping means is connected to the piston of a return blocking means having a cylinder which is secured to the vehicle bodywork. The piston is displaceable within the cylinder in unrestricted manner in the tightening direction but in the opposite direction is blocked.

SUMMARY OF THE INVENTION

The object of the invention is to provide a belt tightener for vehicle safety belt systems wherein a lightweight construction is made possible and load peaks in the webbing system are absorbed after the belt tightening operation.

In the belt tightener of the present invention when a tightening operation is terminated and a predetermined threshold value of tensile load acting on the piston within the cylinder is exceeded, the piston is forced to move within the cylinder with plastic deformation of the cylinder wall.

The cylinder requires little space and because of its elongated constructional form can be easily accommodated in the vehicle. Any load peaks in the webbing system are absorbed by energy conversion, in that the piston is displaced in the cylinder with plastic deformation of the cylinder wall when a predetermined load value is exceeded. The energy conversion can be controlled by the dimensioning of the wall thickness of the cylinder. It is advantageous to thicken the cylinder wall in the region of the cylinder end directed on the side of the gripping means.

The piston/cylinder blocking means can be combined with a pyrotechnical gas generator to provide a pyrotechnical drive assembly.

According to another embodiment the belt tightener drive is derived from a vehicle component which on accident-induced deformation of the front vehicle region performs a relative movement with respect to the passenger compartment of the vehicle. The piston is then connected to the vehicle component via a connecting means which yields under a predetermined tensile load.

Further advantages and features of the invention will be apparent from the following description and from the drawings, to which reference is made.

BRIEF DESCRIPTION OF THE DRAWINGS

In the drawings:

FIG. 5 is a longitudinal section through a piston/cylinder return blocking means in a first embodiment;

FIG. 6 is a longitudinal section of a second embodiment of the return blocking means;

FIG. 7 is a longitudinal section of a combined drive/return blocking mechanism assembly; and FIG. 8 is a cross-section through the piston and cylinder wall of a return blocking means after belt tightening and energy transformation.

DESCRIPTION OF THE PREFERRED EMBODIMENT

Figure 1:
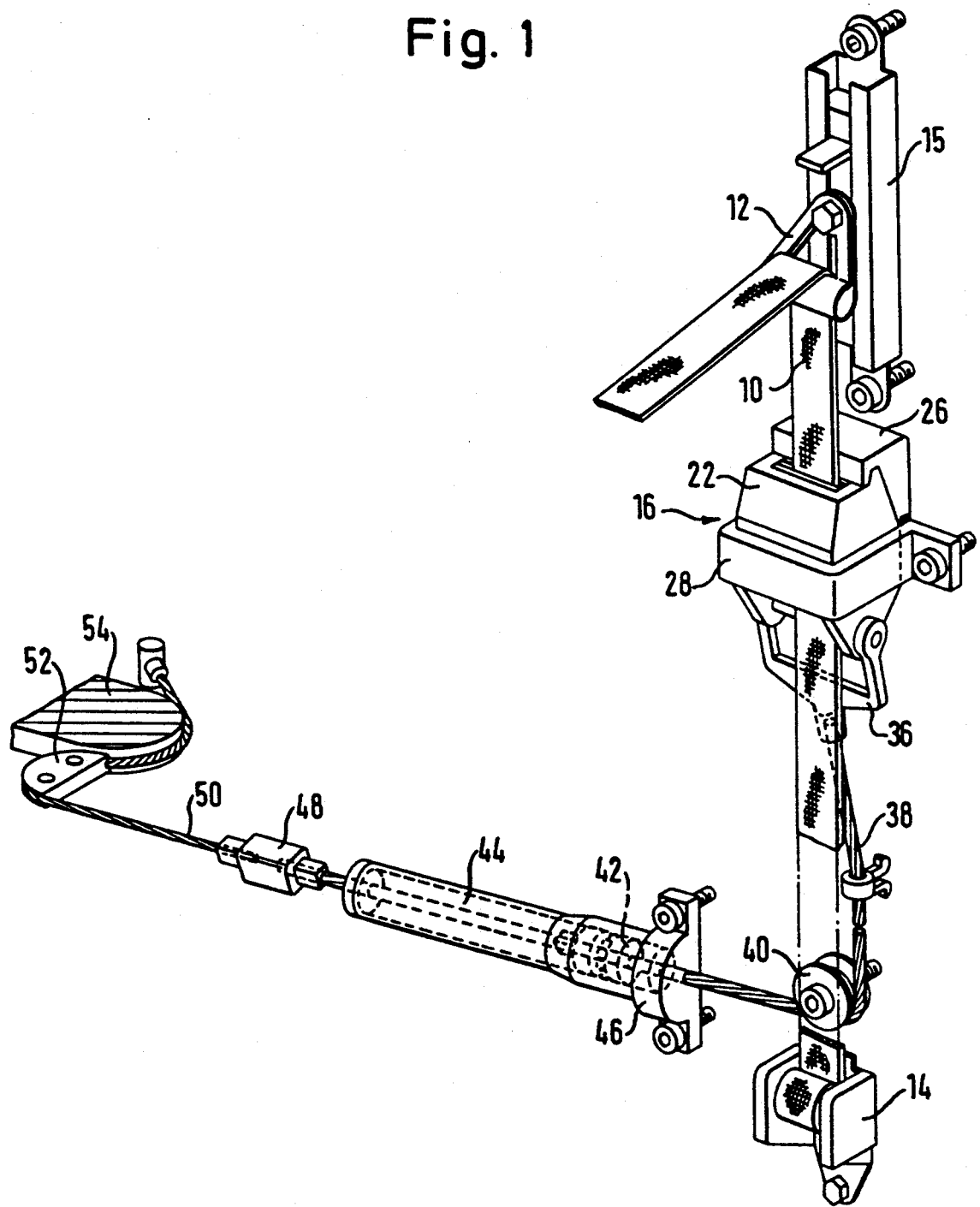
FIG. 1 is a perspective view of a vehicle safety belt system with belt tightener.

In the safety belt system shown in FIG. 1 a webbing section 10 extends approximately vertically from a deflection fitting 12 to a belt retractor 14 which is accommodated in the B post of the vehicle, as is a vertical adjusting means 15 on which the deflection fitting 12 is mounted for vertical adjustment.

Figure 2:
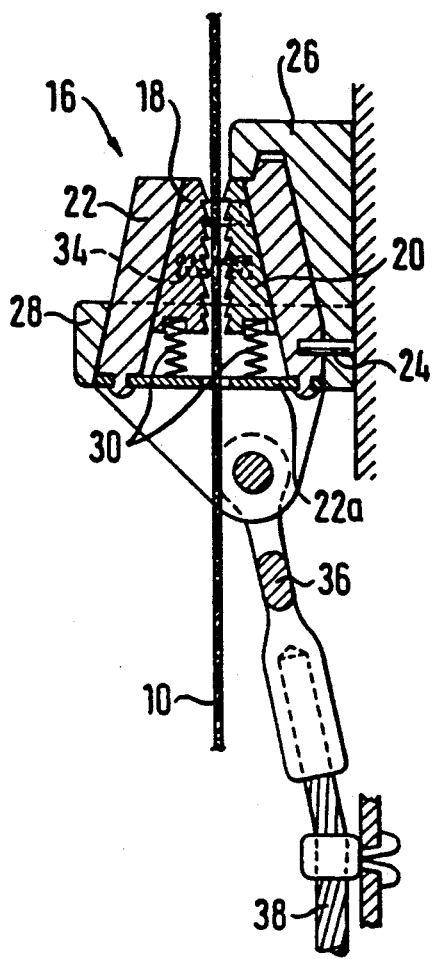
FIG. 2 is a sectional view of a gripping means of the belt tightener according to FIG. 1.
Figure 3:
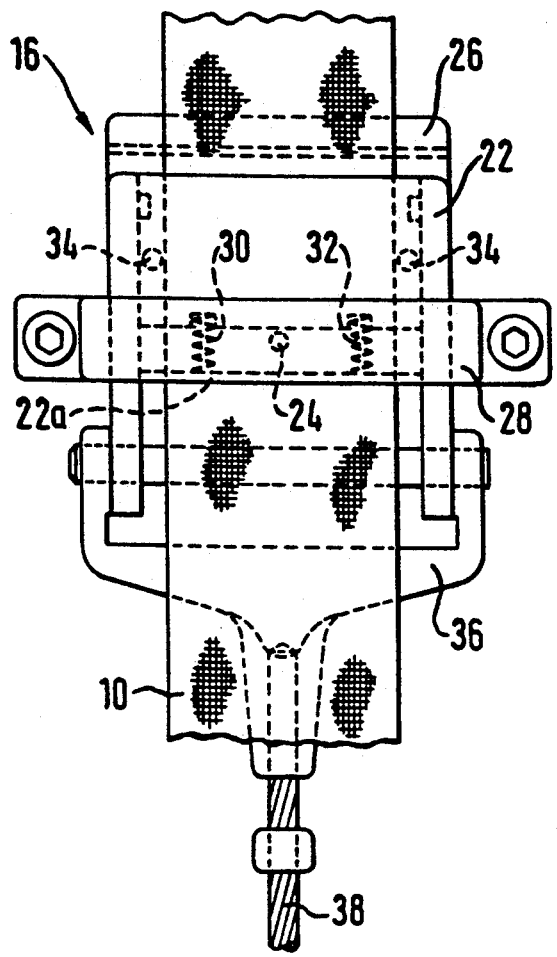
FIG. 3 is a plan view of the gripping means shown in FIG. 2.
Figure 4:
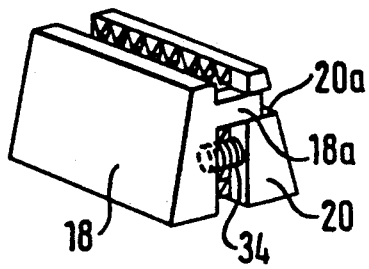
FIG. 4 is a perspective view of two clamping elements of the gripping means shown in FIGS. 2 and 3.

Arranged on the belt webbing 10 is a gripping means 16. As shown in detail in FIGS. 2, 3 and 4, said gripping means 16 consists of two wedge-shaped clamping members 18, 20 which are arranged on either side of the webbing section 10 at a slight distance from the latter, and a receiving member 22, in the interior of which the clamping members 18, 20 are received and at the inner faces of which inclined to the direction of the webbing path the rear faces of the clamping members 18, 20 inclined at the same angle to the direction of the webbing path are supported. In the rest position shown in the Figures the receiving member 22 is fixed by a shear pin 24 to a base 26 which is anchored to the vehicle bodywork A holding 28 secured by means of screws to the vehicle bodywork engages round the receiving member 22 and holds the latter in a defined rest position. At its upper end in the drawings the base 26 forms a stop for the adjacent end face of the clamping member 20. As apparent in FIG. 4, the latter is connected in force-locking manner to the opposite clamping member 18 by lateral strips 18a each engaging into a corresponding groove 20a of the clamping member 20. Each clamping member 18, 20 is biased by two pressure springs 30, 32 in the direction of the webbing path towards the deflection fitting 12 and as a result the upper end face of the clamping member 20 is held in engagement with the stop of the base 26. The pressure springs 30, 32 are supported at their side remote from the clamping members 18, 20 on a bottom plate 22a of the receiving member 22. The clamping members 18, 20 are pressed apart by two pressure springs 34 arranged on either side of the webbing and pressed into engagement with the inner faces of the receiving member 22. The webbing section 10 runs freely between the engagement faces of the clamping elements 18, 20 preferably provided with a toothing, at a slight distance from said faces.

By means of a pivotal stirrup member 36 a tension transmitting element in the form of a pulling cable 38 is connected to the receiving member 22. The pulling cable 38 is led over a deflection pulley 40 and at its end remote from the gripping means 16 is connected to a piston 42 which is displaceably received in the bore of a cylinder 44. The cylinder 44 is secured to the vehicle bodywork by means of a mounting means 46. As apparent in FIGS. 5 and 6, the pulling cable 38 is led axially through the piston 42 and via a connecting means 48 connected to a further pulling cable 50. Said pulling cable 50 is guided over a deflection means 52 to a vehicle component 54 in the front region of the vehicle, led arcuately round said component and secured at its free end to a rigid vehicle bodywork region. The vehicle component 54, for example part of the gearbox of the vehicle, executes on accident-induced deformation of the front vehicle region a relative movement with respect to the vehicle passenger compartment to which the end of the pulling cable 50 is anchored. By this relative movement the length of the pulling cable 50 between the deflection means 52 and the piston 42 is shortened so that a tension is transmitted via the pulling cable 38 and the stirrup member 36 to the receiving member 22. Thus, in this embodiment the belt tightener drive is derived from a vehicle component which on accident-induced deformation of the front vehicle region executes a relative movement with respect to the passenger compartment of the vehicle.

In contrast, in the embodiment shown in FIG. 7 a pyrotechnical drive is provided which comprises a gas generator cartridge 56 which is inserted into a tube piece 58 which is connected to the one end of the cylinder 44 and which opens out into the cylinder chamber in front of the piston 42. On firing the gas generator cartridge 56 the piston 42 is advanced in the cylinder 44 by the pressure gases then generated and as a result a tension is exerted on the pulling cable 38.

When a tensile force is exerted on the receiving member 22 on activation of the belt tightener drive, the shear pin 24 is first sheared off. Then the receiving member 22 is moved downwardly, the clamping elements 18, 20 being simultaneously advanced by the pressure springs 30, 32 so that their engagement faces come into engagement with the webbing, since the pressure springs 30, 32 are of greater dimensions than the pressure springs 34. Due to the wedge form of the clamping elements 18, 22, on further downward movement of the receiving member 22 the clamping of the webbing is automatically enhanced. The webbing gripped by the gripping means is now entrained and displaced in the direction of the belt retractor 14, the belt slack being taken out of the belt system. The travel of the belt tightener is terminated at the latest when the piston 42 has arrived at the free end of the cylinder 44. In the embodiment shown in FIG. 1 the connecting means 48 is so dimensioned that on further increase of the tensile force via the pulling cable 50 it yields and uncouples the pulling cable 50 from the pulling cable 38.

The piston 42 is freely moveable in the cylinder 44 in the direction towards the free end thereof, i.e. in the tightening direction. In the opposite direction its movement is however obstructed by a ball clamping mechanism. This ball clamping mechanism consists of a plurality of balls 62 which are distributed over the periphery of a ramp face 60 on the piston 42 and the outer periphery of which lies opposite the inner wall of the cylinder 44. On movement of the piston 42 in the direction of the deflection pulley 40, the balls 62 are pressed by the ramp face 60 of the piston 42 radially outwardly against the inner wall of the cylinder 44. A further movement is possible only on plastic deformation of the wall of the cylinder 44. On said plastic deformation work is done so that an energy transformation desired for diminishing load peaks in the webbing takes place as soon as a predetermined value of the tensile load in the pulling cable 38 is exceeded. The construction of piston 42 and cylinder 44 shown thus constitutes a return blocking mechanism and at the same time an energy transducer for diminishing load peaks in the webbing. FIG. 8 shows the plastic deformation of the wall of the cylinder 44.

In the embodiments shown in FIG. 6 and 7 the end of the cylinder 44 adjacent the mounting means 46 is thickened in order to increase the threshold above which a plastic deformation takes place. By the dimensioning of the wall thickness of the cylinder 44 the energy transducer can be equipped with the desired characteristic. In the embodiment according to FIG. 6 the cylinder 44 is thickened by a sleeve 44a pushed thereon; in the embodiment according to FIG. 7 the wall thickness of the cylinder 44 is increased in the corresponding region.

Apart from the forms of a belt tightener drive described other known constructions are possible, for example mechanical drives with a spring held under tension

What is claimed is:

1. A belt tightener for a vehicle safety belt system comprising:
   a belt retractor;
   a deflection fitting;
   a safety belt which has a webbing section running freely between said belt retractor and said deflection filling;
   belt gripping means for engaging said webbing section;
   a belt tightener drive connected to said gripping means by a tension transmitting element;
   a hollow cylinder defined by a cylinder wall, said cylinder being adapted to be secured to a vehicle bodywork;
   a piston received in said cylinder and connected to said tension transmitting element;
   said gripping means being movable with a portion of said belt webbing gripped by said gripping means under the action of tensile force transmitted by said tension transmitting element from said belt tightener drive to said gripping means; and
   said piston being free to slide within said cylinder from an initial position in a first direction upon activation of said belt tightener drive but restrained against movement within said cylinder in a second direction opposite to said first direction up to a predetermined threshold value of tensile load transmitted to said piston through said tension transmitting element, and said piston, when said predetermined threshold value is exceeded, being forced to move within said cylinder in said second direction with plastic deformation of said cylinder wall during forced movement of said piston towards said initial position.

2. The belt tightener according to claim 1, wherein said cylinder has a first end directed to said gripping means and a second end opposite said first end, said cylinder wall being thicker on said first end than on said second end.

3. The belt tightener according to claim 1, wherein said belt tightener drive comprises a pyrotechnical gas generator associated with said cylinder and adapted to produce pressurized gas acting on said piston.

4. The belt tightener according to claim 1, wherein said belt tightener drive is derived from a vehicle component which on accident-induced deformation of a vehicle front region undergoes relative movement with respect to the passenger compartment of the vehicle, said tension transmitting element having a first section connected to said vehicle component and a second section connected to said piston, said first and second sections being interconnected by a connecting member, and said connecting member being dimensioned to yield under a predetermined tensile load.

5. A belt tightener for a vehicle safety belt system comprising:
- a belt retractor;
- a safety belt which has a webbing section extending from said belt retractor;
- belt gripping means for engaging said webbing section, said gripping means being movable with a portion of said belt webbing gripped by said gripping means;
- a belt tightener drive means for providing a tensile force for moving said gripping means, said belt tightener drive means being connected to said gripping means by a tension transmitting element for transmitting the tensile force from said belt tightener drive means to said gripping means;
- a hollow cylinder defined by a cylinder wall, said cylinder being adapted to be fixed relative to a vehicle bodywork;
- a piston received in said cylinder and connected to said tension transmitting element, said piston being free to slide within said cylinder from an initial position in a first direction upon activation of said belt tightener drive; and
- means for restraining movement of said piston within said cylinder in a second direction opposite to said first direction up to a predetermined threshold value of tensile load transmitted to said piston through said tension transmitting element, when said predetermined threshold value is exceeded said piston being forced to move within said cylinder in said second direction, said cylinder wall having means for plastically deforming during forced movement of said piston in said second direction for absorbing energy.

* * * * *

UNITED STATES PATENT AND TRADEMARK OFFICE
CERTIFICATE OF CORRECTION

PATENT NO.   : 5,295,714
DATED        : March 22, 1994
INVENTOR(S)  : Artur Föhl It is certified that error appears in the above-identified patent and that said Letters Patent is hereby corrected as shown below:

Column 4, line 24, change "filling" to --fitting--.

Signed and Sealed this

Sixth Day of September, 1994

Attest:

BRUCE LEHMAN

*Attesting Officer*     *Commissioner of Patents and Trademarks*